(12) United States Patent
Gibbs (10) Patent No.: US 6,208,120 B1
(45) Date of Patent: Mar. 27, 2001

(54) EXCITATION CONTROL SYSTEM FOR ROTATING ELECTRICAL APPARATUS

(75) Inventor: Irving A. Gibbs, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/304,479

(22) Filed: May 3, 1999

(51) Int. Cl.[7] .................................................. H02P 9/14
(52) U.S. Cl. ................................................ 322/59; 322/61
(58) Field of Search ................................... 322/25, 27, 28, 322/36, 59, 61, 63, 69; 363/69, 87, 54

(56) References Cited

U.S. PATENT DOCUMENTS

| | | | |
|---|---|---|---|
| 4,152,636 | * | 5/1979 | Gorden .................................... 322/25 |
| 4,463,306 | * | 7/1984 | De Mello et al. ....................... 322/28 |
| 4,723,106 | * | 2/1988 | Gibbs et al. ............................ 322/26 |
| 4,741,023 | * | 4/1988 | Lawson ................................. 379/106 |
| 4,855,664 | * | 8/1989 | Lane ....................................... 322/19 |
| 5,440,222 | * | 8/1995 | Tanaka et al. .......................... 322/25 |
| 5,483,147 | * | 1/1996 | Ilic et al. ................................ 322/25 |
| 5,594,322 | * | 1/1997 | Rozman et al. ........................ 322/10 |
| 5,694,027 | * | 12/1997 | Satake et al. ........................... 322/63 |
| 5,698,968 | * | 12/1997 | Takagi et al. ........................... 322/58 |
| 5,963,440 | * | 10/1999 | Gibbs et al. ............................ 363/54 |
| 5,963,441 | * | 4/2000 | Gibbs et al. ............................ 363/87 |
| 6,046,917 | * | 4/2000 | Gibbs et al. ............................ 363/69 |

* cited by examiner

Primary Examiner—Nicholas Ponomarenko
(74) Attorney, Agent, or Firm—Martin J. Moran (57) ABSTRACT

An excitation control system for a generator includes a silicon controlled rectifier bridge having an input interconnected with a plurality of alternating current (AC) phases of positive and negative polarity, an output interconnected with the field input of the generator in order to provide an excitation voltage thereto, and an SCR segment for each of the positive and negative polarities of the AC phases. Each of the SCR segments has an SCR responsive to a control signal in order to control current conduction within the segment between the input and the output of the SCR bridge. A regulator circuit requests a maximum value of the excitation voltage for the generator. The auxiliary contacts of a generator circuit breaker determine when the generator is on-line and connected to a power circuit. A phase lock loop provides an error signal from the AC phases. A control circuit outputs control signals to the SCR segments in order to control current conduction within the segments. The control circuit includes a force fire circuit which repetitively and simultaneously outputs the control signals to each of the SCR segments in response to: (a) the error signal exceeding a predetermined value, (b) the maximum value of the excitation voltage for the generator is requested by regulator circuit, and (c) the auxiliary contacts determine that the generator is on-line, in order that the SCR bridge emulates a diode bridge.

20 Claims, 7 Drawing Sheets

EXCITATION CONTROL SYSTEM FOR ROTATING ELECTRICAL APPARATUS

CROSS REFERENCE TO RELATED APPLICATION

This application is related to commonly assigned, application Ser. No. 09/304,480 filed May 3, 1999, entitled "Controlled Rectifier Bridge and System" by Gibbs et al., now U.S. Pat. No. 6,046,917.

BACKGROUND OF THE INVENTION

1. Field of the Invention

This invention pertains generally to excitation control systems for rotating electrical apparatus and, more particularly, to such systems employing rectifiers, such as three-phase semiconductor controlled rectifier (SCR) bridges, for converting alternating current (AC) to direct current (DC) to provide excitation voltage to a generator.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs). For example, when the generator, is on-line, generator field excitation is provided thereto. However, certain faults in the output power circuit of the generator may disturb the voltage fed into the excitation control system, thereby causing the excitation to the generator to shut off.

For example, disturbances in the input voltage to the phase lock loop (PLL) of the control system may be caused by faults, such as single line-to-ground faults, line-to-line faults and three-phase faults that occur in the power circuit when the generator's circuit breaker contacts are closed. Accordingly, there is room for improvement.

SUMMARY OF THE INVENTION

The present invention provides improvements in the operation of an excitation control system for a rotating electrical apparatus, such as a generator. Normally, each of the segments of a controlled rectifier bridge responds to a control signal in order to control current conduction within the segments between the input and output of the controlled rectifier bridge. Whenever an alternating current phase error signal exceeds a predetermined value, the maximum value of the excitation voltage is requested for the rotating electrical apparatus, and the rotating electrical apparatus is on-line or connected to its power circuit, the control signals are repetitively and simultaneously output to each of the segments in order that the controlled rectifier bridge emulates a diode bridge.

As one aspect of the invention, an excitation control system for a rotating electrical apparatus comprises a controlled rectifier bridge including an input interconnected with a plurality of alternating current phases each of which has a positive polarity and a negative polarity, an output interconnected with the input of the rotating electrical apparatus in order to provide an excitation voltage thereto, and a segment for each of the positive and negative polarities of the alternating current phases, with each of the segments having an element responsive to a control signal in order to control current conduction within the segment between the input and the output of the controlled rectifier bridge. A means requests a maximum value of the excitation voltage for the rotating electrical apparatus. A means determines when the rotating electrical apparatus is on-line. A means provides an error signal from the alternating current phases. A means outputs the control signals to the segments in order to control current conduction within the segments and includes means for repetitively and simultaneously outputting the control signals to each of the segments in response to: (a) the error signal exceeding a predetermined value, (b) the maximum value of the excitation voltage for the rotating electrical apparatus is requested by the means for requesting; and (c) the means for determining determines the rotating electrical apparatus is on-line, in order that the controlled rectifier bridge emulates a diode bridge.

As another aspect of the invention, an excitation control system for a rotating electrical apparatus comprises a transformer including a plurality of primary windings interconnected with alternating current phases and also including a plurality of secondary windings having a plurality of alternating current phases each of which has a positive polarity and a negative polarity. At least one controlled rectifier bridge includes an input interconnected with the alternating current phases of the secondary windings of the transformer, an output interconnected with an input of the rotating electrical apparatus in order to provide an excitation voltage thereto, and a segment for each of the positive and negative polarities of the alternating current phases of the secondary windings, with each of the segments having an element responsive to a control signal in order to control current conduction within the segment between the input and the output of the controlled rectifier bridge. A means regulates the output of the rotating electrical apparatus and includes an output having a signal which requests a maximum value of the excitation voltage for the rotating electrical apparatus. A means connects and disconnects the output of the rotating electrical apparatus to a power circuit and includes an output having a signal which indicates that the rotating electrical apparatus is connected to the power circuit. A means provides an error signal from the alternating current phases of the secondary windings of the transformer. A means outputs the control signals to the segments in order to control current conduction within the segments and includes means for repetitively and simultaneously outputting the control signals to each of the segments in response to: (a) the error signal exceeding a predetermined value, (b) the output of the means for regulating having the signal which requests the maximum value of the excitation voltage for the rotating electrical apparatus, and (c) the output of the means for connecting and disconnecting having the signal which indicates that the rotating electrical apparatus is connected to the power circuit, in order that the controlled rectifier bridge emulates a diode bridge.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
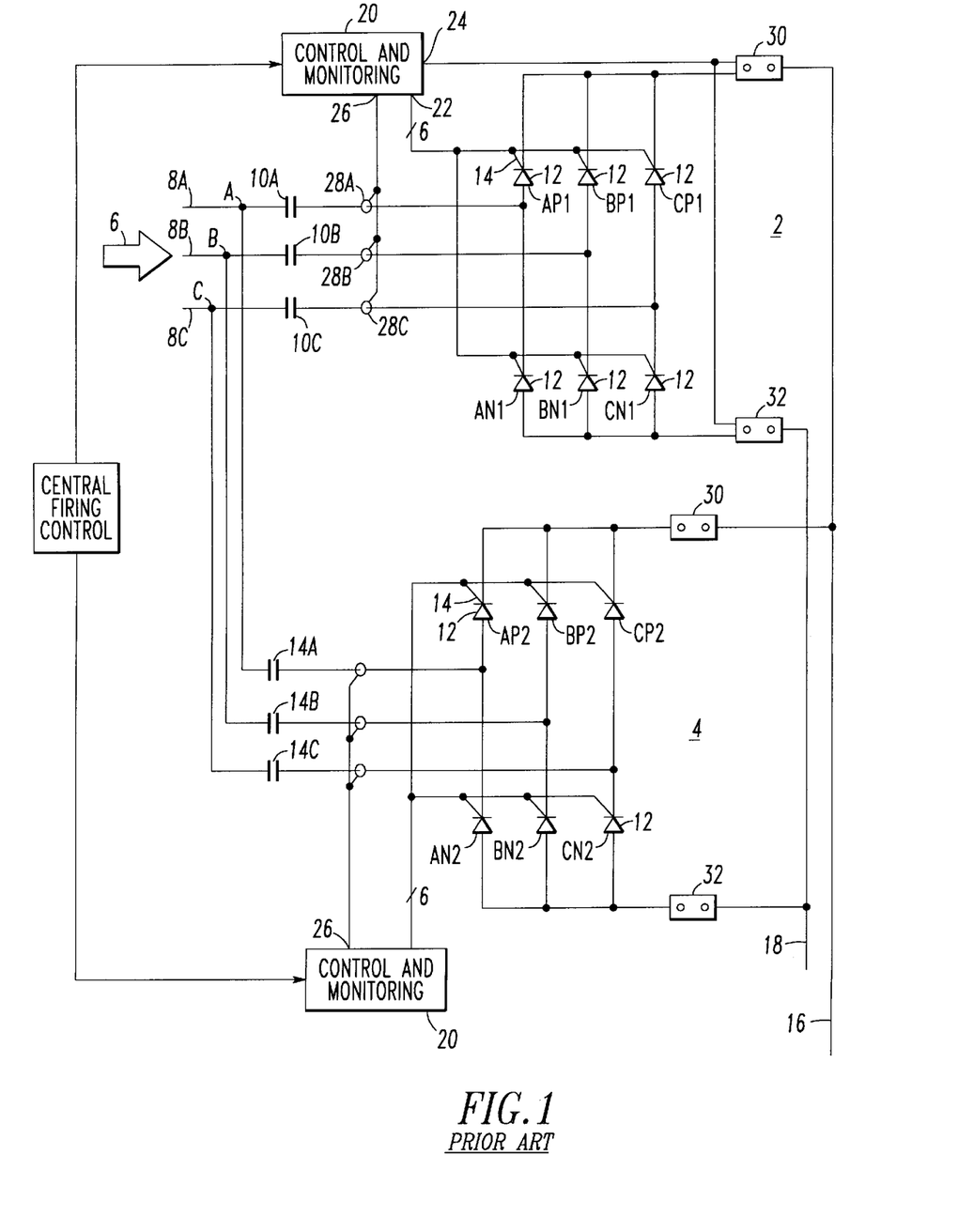
FIG. 1 is a circuit block diagram of two, three-phase, SCR bridges which are fed from a common three-phase source and are connected in parallel to provide an additive current output.

Bridges of semiconductor controlled rectifiers (SCRs) are generally employed to convert alternating current (AC) sinusoidal signal waveforms to direct current (DC). As shown in FIG. 1, two controlled rectifier bridges 2,4 are connected in parallel. Each of the bridges 2,4 receives a multi-phase current input from a common AC source 6 (e.g., a motor generator, field transformer, power potential transformer (PPT)). A three-phase current input is employed in this example, although the invention is applicable to a wide range of phase counts. The several phases of input current, shown as 8A, 8B and 8C, are fed through contacts 10A, 10B and 10C, and 14A, 14B and 14C, respectively, to rectifying segments on the two respective bridges 2,4.

The exemplary bridges 2,4 each have six cells or segments, one for each polarity of each of the phase currents 8A,8B,8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input 14. When a suitable control signal is provided to one of the inputs 14, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown).

An exemplary microprocessor-based control and monitoring circuit 20 has six control outputs 22, which are interconnected with the six firing inputs 14 of the SCRs 12, for outputting control signals to the segments AP1,BP1,CP1, AN1,BN1,CN1 to control current conduction within those segments, and various monitoring inputs 24,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code= $100010_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown).

Figure 2:
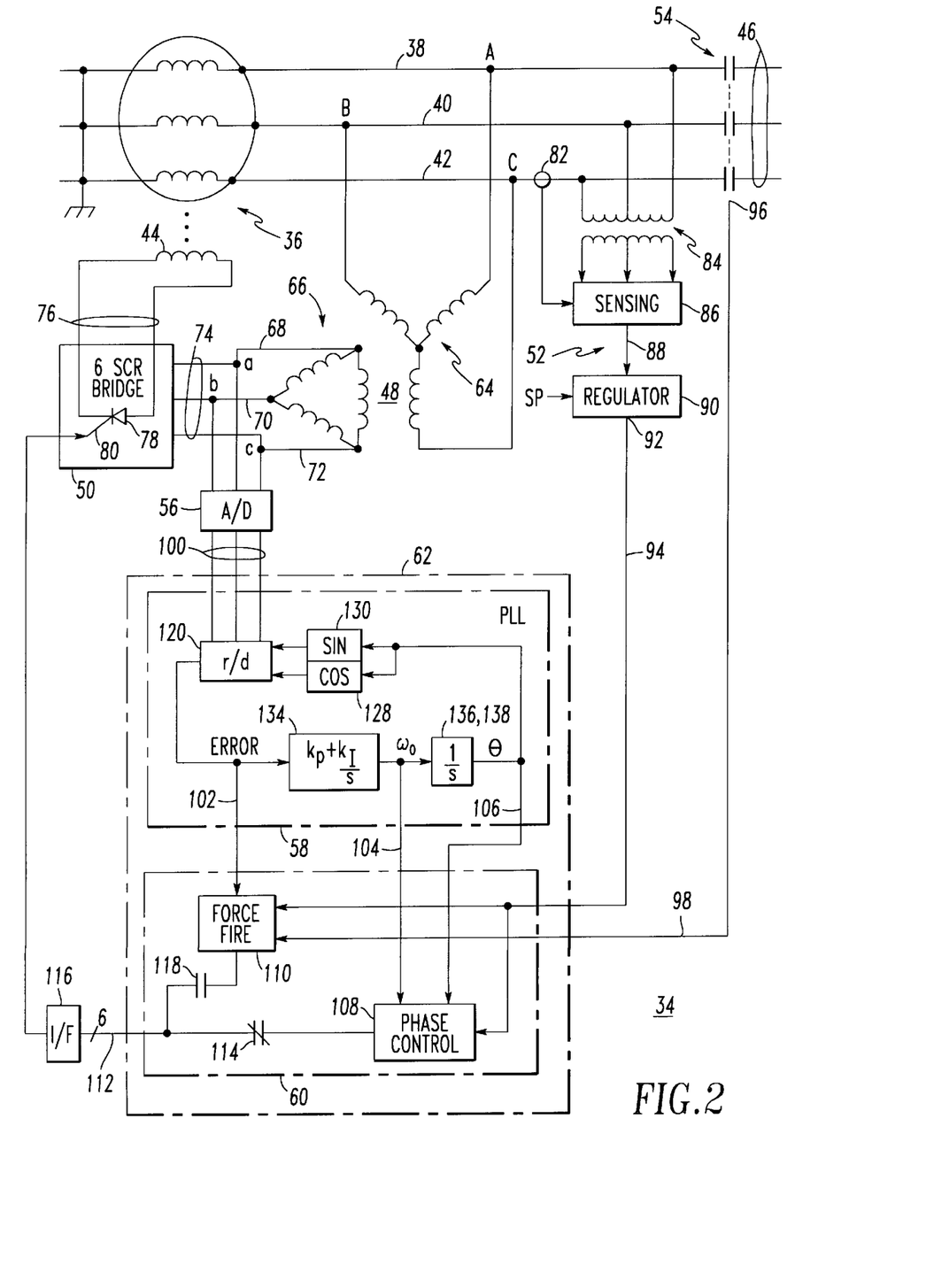
FIG. 2 is a block diagram of an excitation control system for a generator in accordance with the invention.

Referring to FIG. 2, an excitation control system 34 for generator 36 is illustrated. The generator 36 includes an output having three alternating current (AC) phases 38,40,42 (A,B,C) and a generator field input 44 having an excitation voltage. The three phases 38,40,42 output by the generator 36 provide power to a power circuit 46.

The excitation control system 34 includes a transformer 48, a controlled rectifier bridge 50, a regulator circuit 52, a generator circuit breaker 54, analog-to-digital (A/D) converters 56, a phase lock loop (PLL) 58, a firing control circuit 60, and a suitable processor, such as microprocessor (AP) 62. The exemplary transformer 48 is a three-phase power potential transformer (PPT) including three primary windings 64 in a WYE-configuration and three corresponding secondary windings 66 in a delta-configuration, although other transformer configurations may be employed. The primary windings 64 are interconnected with the AC phases 38,40,42, while the corresponding secondary windings 66 have three AC phases 68,70,72 (a,b,c), respectively, each of which has a positive polarity and a negative polarity and a common frequency (e.g., 50 Hz, 60 Hz). The PLL 58 typically receives its input 100 from the secondary or bridge side of the PPT 48. The PPT 48 is normally connected to the terminals of the generator 36 and, thus, this exemplary system is commonly referred to as a "terminal fed excitation system."

In a like manner as the bridges 2,4 of FIG. 1, the exemplary six-SCR controlled rectifier bridge 50 includes an input 74 interconnected with the AC phases 68,70,72 of the secondary windings 66 of the transformer 48, an output 76 interconnected with the field input 44 of the generator 36 in order to provide the excitation voltage thereto, and a segment for each of the positive and negative polarities of the AC phases 68,70,72. In turn, each of the segments has an element, such as SCR 78, responsive to a control signal 80 in order to control current conduction within the segment between the input 74 and the output 76 of the controlled rectifier bridge 50.

The regulator circuit 52 functions to regulate the output of the generator 36 in terms of phase current and three-phase voltage of the AC phases 38,40,42. The regulator circuit 52 includes a current transformer (CT) 82 and a three-phase potential transformer (PT) 84 which provide corresponding current and voltage signals from the power circuit 46 to a sensing sub-system 86. In turn, the output 88 of the sub-system 86 is input by the regulator sub-system 90 along with one or more setpoints SP. The sub-system 90 employs a suitable control algorithm in order to provide, at output 92, a regulator output signal 94 which, under appropriate conditions, requests a maximum value of the excitation voltage for the generator 36 at the generator field input 44. In particular, the control algorithm increases excitation in response to dips in terminal voltage and decreases excitation in response to increases in terminal voltage. When the terminal voltage decreases without suitable response, the output 92 of the regulator circuit 52, which feeds the firing control circuit 60, integrates to its maximum value.

For example, the regulator output signal 94 is typically employed to maintain the three-phase voltages to the power circuit 46 (as measured by PT 84) and to increase or decrease the excitation voltage to the generator 36 with respective higher or lower levels of current (as measured by CT 82). In order to accomplish that change, the firing angle employed by the bridge 50 is retarded (reduced) or advanced (increased) to increase or decrease, respectively, the excitation voltage. Thus, if the three-phase voltage of the power circuit 46 goes down, then the regulator output signal 94 goes up, thereby reducing the firing angle and providing more field current to the generator 36.

As is well-known, the generator circuit breaker 54 is employed to connect and disconnect the output of the generator 36 to the power circuit 46. The circuit breaker 54 includes an output 96 having a signal 98 (i.e., "52G BREAKER," which is not to be confused with the regulator circuit 52) which indicates that the circuit breaker separable contacts are closed and the generator 36 is connected to the power circuit 46. Preferably, as is also well-known, the breaker 54 includes one or more auxiliary contacts (not shown) which provide the signal 98.

Preferably, the exemplary $\mu$P 62 is employed to provide the functions of the PLL 58 and the firing control circuit 60, although one or both of the PLL 58 and circuit 60 may be provided by equivalent analog or hybrid circuits (not shown). The PLL 58 receives from the A/D converter 56 three digital AC signals 100 which represent the voltage of the three AC phases 68,70,72. In turn, the PLL 58 outputs an error signal 102, a frequency signal 104 and a phase reference signal 106 to the firing control circuit 60.

Figure 9A:
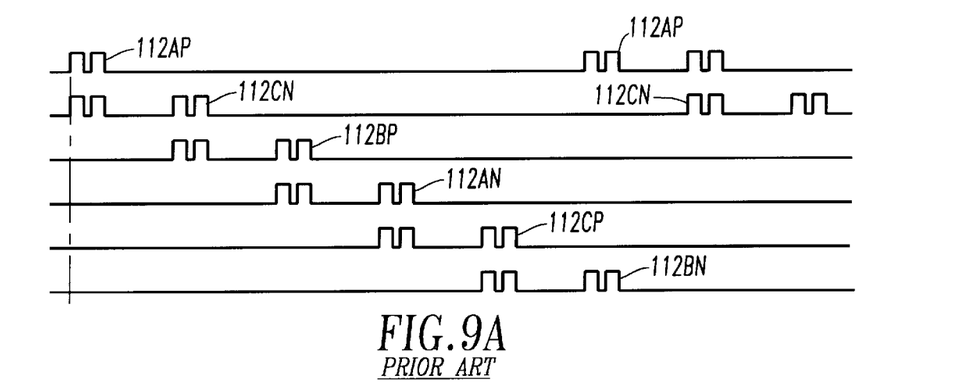
FIGS. 9A, 9B and 9C are plots of conventional firing pulses, unbalance mode firing pulses, and synchronized force firing pulses, respectively.

In accordance with the invention, the firing control circuit 60 includes a phase control circuit 108 and a "force fire" circuit 110. Under normal operation, the output of the phase control circuit 108 is employed to provide six firing signals 112 through normally closed software contact 114 and interface (I/F) 116 to the controlled rectifier bridge 50. The phase control circuit 108 employs the signals 94,104,106 and provides the firing signals 112 as shown in FIG. 9A. Typically, the individual segments of the bridge 50 are fired every 60° of the AC cycle in the order: APn,CNn,BPn,ANn, CPn,BNn as provided by signals 112AP, 112CN, 112BP, 112AN, 112CP, 112BN of FIG. 9A, which preferably include a plurality of firing pulses (e.g., two or more, such as a count of 8 pulses, although for convenience of illustration only two pulses are shown). The phase control circuit 108 employs the regulator output signal 94, the frequency signal 104, and the phase reference signal 106 in order to predict the time to fire the six SCRs 78 of the bridge 50 and, thus, control current conduction within the segments.

Also in accordance with the invention, the "force fire" circuit 110 is employed to repetitively and simultaneously output the control signals 112 to each of the segments in response to the combination of three conditions: (1) the error signal 102 exceeds a predetermined value; (2) the output 94 of the regulator circuit 52 has the signal which requests the maximum value of the excitation voltage for the generator 36; and (3) the output 96 of the generator circuit breaker 54 has the signal 98 which indicates that the generator 36 is connected to the power circuit 46. Under those conditions, the "force fire" circuit 110 outputs the control signals 112, in the manner shown in FIG. 9C, through normally open software contact 118 (which is closed, with normally closed software contact 114 being opened), in order that the controlled rectifier bridge 50 emulates a diode bridge.

By firing the SCRs of the SCR bridge 50 of FIG. 2 in a manner that causes the bridge to emulate a diode bridge, the excitation voltage to the generator 36 is maintained whenever faults or other disturbances in the power circuit 46 affect the input voltage (as input by PPT 48) to the excitation control system 34. This action, depending upon the severity of the fault, may eliminate needless trips.

If the error signal 102 employed by the PLL 58 is relatively large (which indicates that the AC phases 38,40,42 are unbalanced, relatively small in magnitude, and/or not symmetrical three-phase voltages in accordance with a normal generator output), the generator 36 is on-line, and the output of the voltage regulator 52 is full on (i.e., the generator 36 requires more excitation and maximum excitation is requested), then the SCR bridge 50 is made to act like a diode bridge. This is accomplished by employing a "force firing" function through the circuit 110 which sends synchronized firing pulses (shown in FIG. 9C) to all SCRs in all the SCR bridges, such as 50, at a relatively high rate. The result of force firing is that any voltage at the input 74 to the SCR bridge 50 is rectified and applied to the generator's excitation field.

The error signal 102 of the PLL 58 is employed since it is an immediate indication of a significant disturbance. The "52G BREAKER" signal 98 is employed since firing control intervention is utilized when the generator 36 is on-line. Otherwise, if the generator is off-line, then no such intervention is required or desired.

The PLL 58 receives the signals 100 from the PPT A/D converter 56, locks to those signals, and generates the error signal 102. The error signal 102 is employed to create the phase reference signal 106, 0, for the firing control circuit 60. With disturbances in the input voltage to the PLL 58, the error signal 102 changes. In turn, this causes the phase reference signal 106 to change. Since the phase control circuit 108 employs the phase reference 106 to determine exactly when to fire each SCR in the SCR bridge 50, a noisy phase reference 106 or error signal 102 causes the output voltage of the SCR bridge 50 to be somewhat unstable. For example, as a result of phase unbalance, some SCRs may be fired too early and, thus, not turned on at all.

It will be appreciated that the generator 36 and the excitation control system 34 employ a suitable generator starting circuit and algorithm (not shown) for controlling initial start-up of the generator 36 (e.g., when there is no voltage being output by the generator to the three phases 38,40,42).

Figure 3:
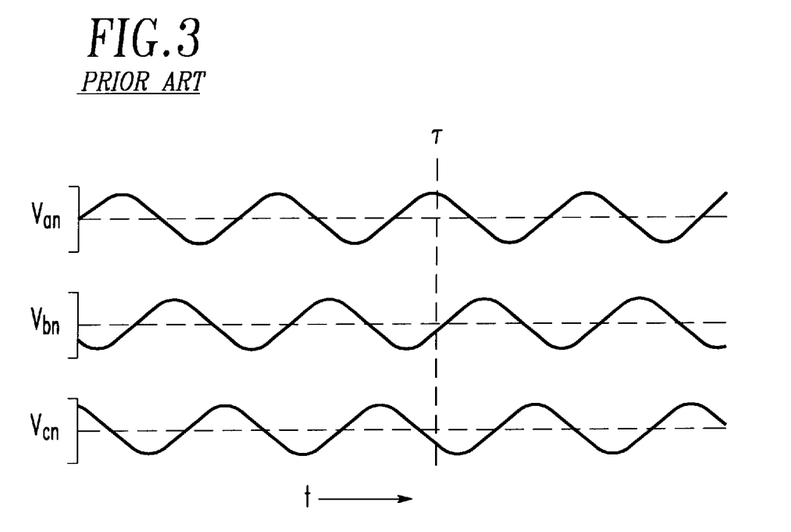
FIG. 3 is a timing diagram for a three-phase voltage set.

Operation of the PLL 58 is discussed in connection with FIGS. 3–6. FIG. 3 shows a timing diagram for an exemplary three-phase voltage set ($V_{an}$, $V_{bn}$, $V_{cn}$) which defines vectors in the stationary a-b-c axis system of FIG. 4. In this example, the three-phase voltages are measured from one of the phases to neutral (which is not shown in FIG. 2 for convenience of illustration). Thus, $V_{an}$ is the voltage measured between phase 68 (a) and neutral.

Figure 4:
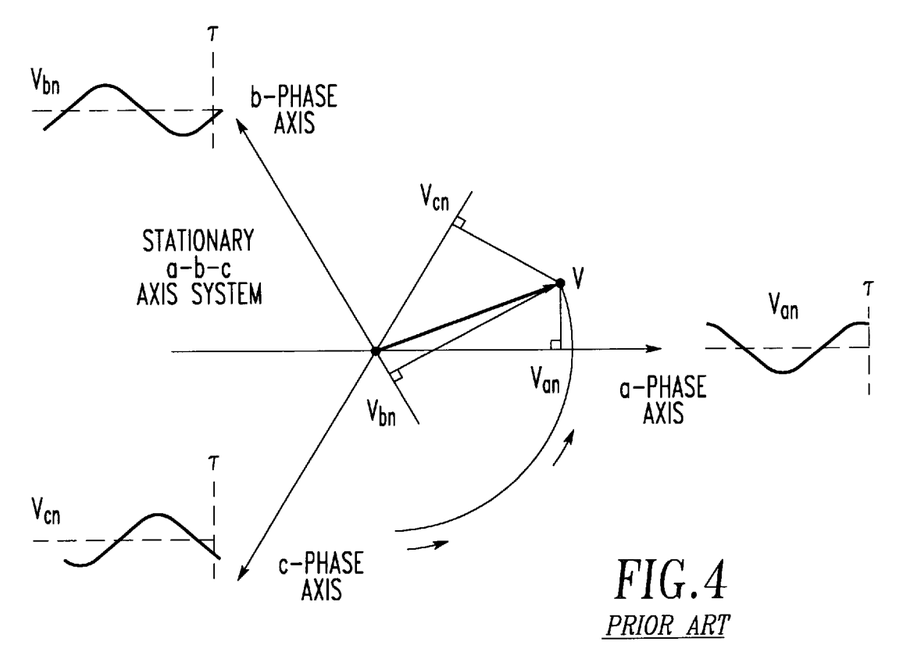
FIG. 4 is a vector diagram of an instantaneous three-phase voltage set referenced to a stationary a-b-c axis system.

At any particular instant (τ) of time (t), a voltage may be uniquely defined by a point in a plane. If a line is drawn from the origin to this point, then, by definition, the vector (V) has a vertical projection ($V_{an}$, $V_{bn}$, $V_{cn}$) onto each axis in the a-b-c axis system. This vector contains all information about the voltage set on an instantaneous basis and rotates (e.g., typically at 60 Hz) around the plane following unique trajectory. The vector traces a circular trajectory for a balanced three-phase sine-wave set. However, other trajectories are followed during transients, harmonics or unbalance conditions. Thus, FIG. 4 shows the vector representation of the instantaneous three-phase voltage set referenced to the stationary a-b-c axis system.

Figure 5:
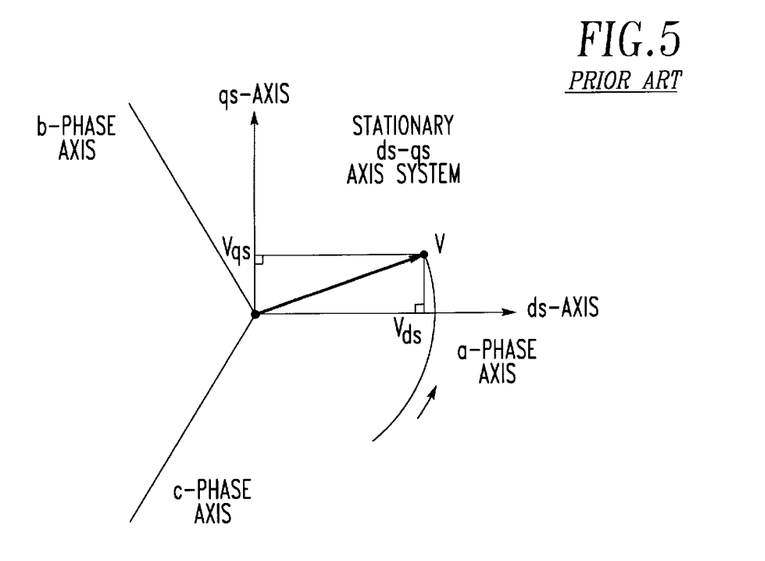
FIG. 5 is a vector diagram in ds-dq coordinates.

In FIG. 5, a different coordinate system is superimposed over the a-b-c axis system. In this system, the voltage set may also be described by its "ds" and "qs" components. Like the a-b-c axis system, the new system is also a stationary axis system where the ds-axis (i.e., direct-stationary-axis) is coincident with the phase a axis, and the qs-axis (i.e., quadrature-stationary-axis) is orthogonal to it. Otherwise, the voltage set continues to rotate in the plane and is not changed in any way.

Equations 1–4 define the phase-to-phase voltages ($V_{ab}$, $V_{bc}$) in terms of the three line-to-neutral voltages ($V_{an}$, $V_{bn}$, $V_{cn}$).

$$V_{ab}=V_{an}-V_{bn} \qquad \text{Eq. (1)}$$

$$V_{bc}=V_{bn}-V_{cn} \qquad \text{Eq. (2)}$$

$$V_{ab}=V_p \sin(\omega t)-V_p \sin(\omega t-2\pi/3) \qquad \text{Eq. (3)}$$

$$V_{bc}=V_p \sin(\omega t-2\pi/3)-V_p \sin(\omega t+2\pi/3) \qquad \text{Eq. (4)}$$

wherein:
$V_{an}$ is the line-to-neutral voltage of phase a;
$V_{bn}$ is the line-to-neutral voltage of phase b;
$V_{cn}$ is the line-to-neutral voltage of phase c;
$V_{ab}$ is the phase-to-phase voltage between phases a and b;
$V_{bc}$ is the phase-to-phase voltage between phases b and c;
$V_p$ is peak voltage;
ω is line frequency; and
t is time.

Figure 6:
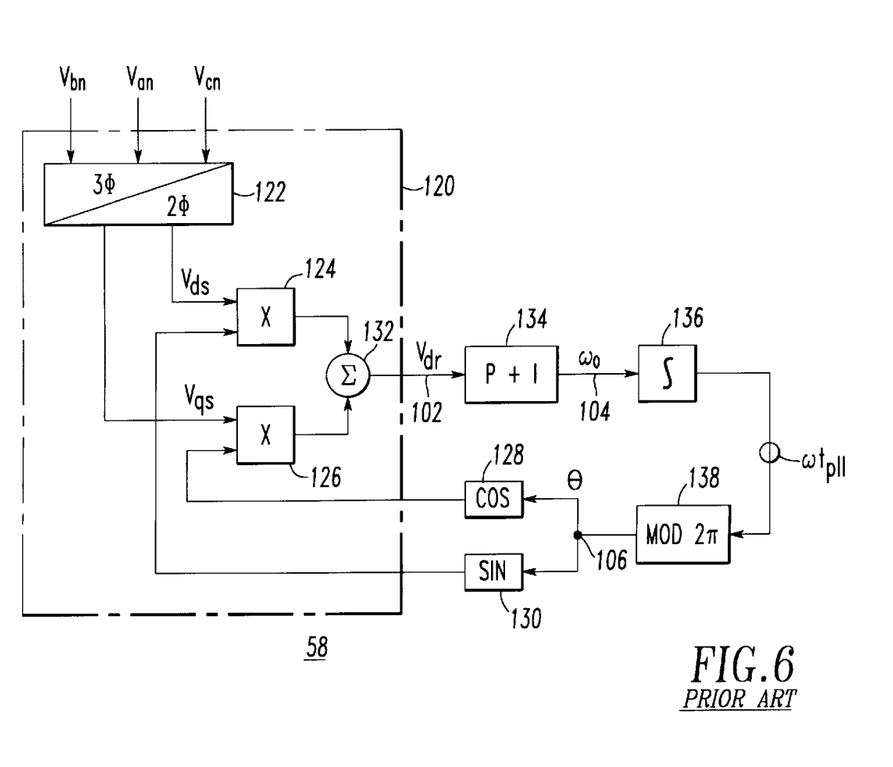
FIG. 6 is a block diagram of the phase lock loop (PLL) of the excitation control system of FIG. 2.

Referring to FIG. 6, operation of the PLL 58 of FIG. 2 is shown. At transformation block 120, a rotating to direct (rid) axis transformation is provided. Equations 5 and 6 define the voltages of the ds- and qs-axes in terms of the phase-to-phase voltages.

$$V_{ds}(t)=V_{bc} \qquad \text{Eq. (5)}$$

$$V_{qs}(t) = \left(V_{ab} + \frac{V_{bc}}{2}\right)\frac{2}{\sqrt{3}} \qquad \text{Eq. (6)}$$

wherein:
$V_{ds}(t)$ is the voltage of the direct-stationary-axis (ds-axis) which is coincident with the phase a three-phase axis; and
$V_{qs}(t)$ is the voltage of the quadrature-stationary-axis (qs-axis) which is orthogonal to the ds-axis.

The three-phase to two-phase conversion block 122 inputs the three-phase voltage set ($V_{an}$, $V_{bn}$, $V_{cn}$) and outputs the sampled two-phase ds- and dq-voltages, $V_{ds}$ and $V_{qs}$ as defined by Equations 7 and 8, respectively.

$$V_{ds}=V_{ds}(t=\tau) \qquad \text{Eq. (7)}$$

$$V_{qs}=V_{qs}(t=\tau) \qquad \text{Eq. (8)}$$

wherein:
τ is the time of a set of discrete samples.

Preferably, the μP 62 of FIG. 2 samples the three-phase voltage set 100 as output by the A/D 56 at a suitable periodic rate and, also, calculates the PLL outputs as discussed below.

The PLL 58 employs multipliers 124,126, COSINE (COS) function block 128, SINE (SIN) function block 130, and summer 132 to calculate the error signal 102, $V_{dr}$, of FIG. 2 from the sampled voltages, $V_{ds}$ and $V_{qs}$, as defined by Equation 9.

$$V_{dr}=V_{ds}\sin\theta+V_{qs}\cos\theta \qquad \text{Eq. (9)}$$

wherein:
θ is the phase reference signal 106 (e.g., angle (0≦θ≦2π)) which is output by the PLL 58;
$V_{dr}$ is the error signal 102 which is output by the PLL 58;
$\omega_0$ is the frequency signal 104 which is output by the PLL 58; and
$\omega t_{pll}$ is an internal angle ($\omega t_{pll} \geq 0$) of the PLL 58.

Although the exemplary embodiment shows the error signal 102 being calculated by summation, other equivalent embodiments may employ addition and/or subtraction of positive and/or negative values of the outputs of the multiplier blocks 124,126 to calculate equivalent error signals.

A proportional plus integral (P+I) function block 134 employs the error signal 102 and provides the frequency signal 104, $\omega_0$, which follows the frequency of the three sensed phase voltages, $V_{an}$, $V_{bn}$, $V_{cn}$. In turn, an integration function block 136 provides the internal angle, $\omega t_{pll}$, from the frequency signal 104. Then, a module 2π function block 138 outputs the phase reference signal 106, θ, from the internal angle, $\omega t_{pll}$.

Figure 7:
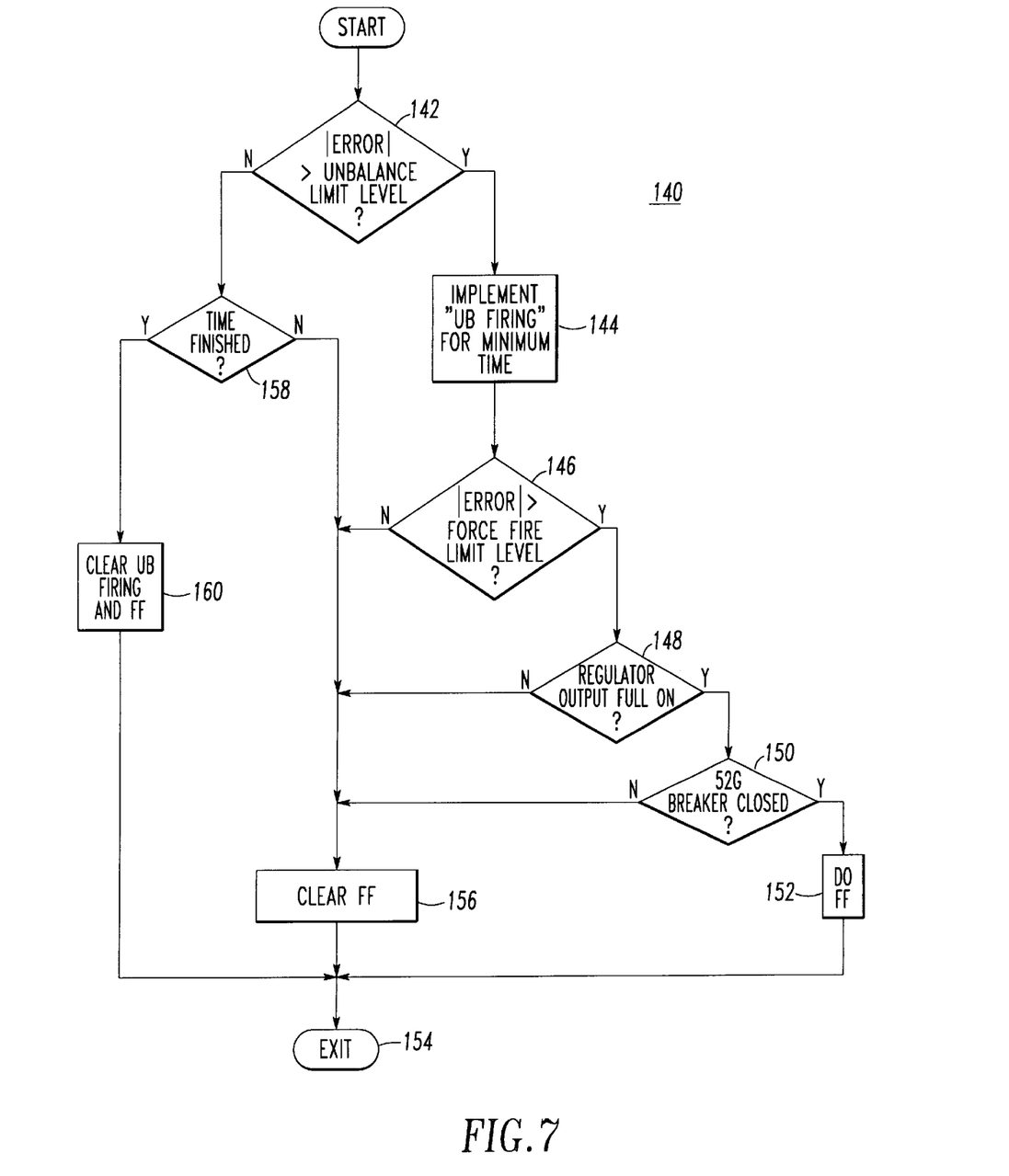
FIG. 7 is a flowchart of software executed by the firing control circuit processor of FIG. 2.

FIG. 7 is a flowchart of a software routine 140 which is executed by the μP 62 of FIG. 2. At 142, it is determined whether the absolute value of the error signal 102 exceeds a predetermined value, the "unbalance limit level." If so, at 144, the phase control circuit 108 of the firing control circuit 60 increases the number of pulses (as shown at signal 112AP' of FIG. 9B) in the normal "picket fence firing pattern" (FIG. 9A) sent to each SCR in the SCR bridge 50. This gives each SCR a longer period of time within which to turn on. This action is termed "unbalance firing". Also, at 144, a timer (not shown) of the μP 62 is started for later use by the routine 140.

For example, unbalance firing pulses are preferably employed in response to certain fault or other abnormal conditions. In this unbalance mode, the AC input waveform 100 from the secondary or bridge side of the PPT 48 is degraded and, thus, the AC phases 68,70,72 are not three-phase symmetrical voltages. As a result, at 144, the count of firing pulses is increased (from, e.g., 4 to 16 in the exemplary embodiment, although other pulse counts are possible). In this manner, the chance of completely missing the scheduled firing of an SCR is significantly reduced.

Next, at 146, it is determined whether the absolute value of the error signal 102 exceeds a predetermined value, the "force fire limit level," which is greater than the "unbalance limit level." If so, at 148 and 150, the firing control circuit 60 checks two additional conditions. First, at 148, it is determined whether the regulator output signal 94 is full on. If so, then, at 150, if the "52G BREAKER" signal 98 indicates that the circuit breaker 54 is closed and, thus, the generator 36 is on-line, then "force firing" of the SCR bridge 50 is to be implemented. In turn, at 152, a logical flag (FF) is set and, in response, the normally closed software contact 114 is opened, the normally open software contact 118 is closed, and the force fire circuit 110 repetitively and simultaneously outputs six exemplary firing signals 112 through the interface (I/F) 116 to each of the exemplary six SCRs 78 in the SCR bridge 50 (and to any other parallel bridge (not shown)).

This provides a synchronized picket fence of pulses to all the SCRS. Each pulse to the phase A positive SCR (i.e., phase AP) is timed so that it arrives at the same time as the pulses to the other SCRs (i.e., phase AN, BP, BN, CP, and CN). The result of force firing is that the SCR bridge 50 behaves like a diode bridge, thereby rectifying its input 74 to mimic a diode bridge.

After 152, the routine 140 exits at 154. If any of the tests at 146, 148 and 150 are not met, then, at 156, the logical flag (FF) is cleared and, in response, the normally closed contact 114 is closed, the normally open contact 118 is opened, and firing pulses are provided by the phase control circuit 108. After 156, the routine 140 exits at 154.

Otherwise, at 142, if the absolute value of the error signal 102 does not exceed the predetermined "unbalance limit level," then, at 158, the timer started at 144 is checked. If a predetermined time period has expired, then, a sufficient period of operation with the increased number of pulses in the normal "picket fence firing pattern" has been provided. Then, at 160, the logical flag (FF) is cleared and, in response, the normally closed contact 114 is closed, the normally open contact 118 is opened, and conventional firing pulses are provided by the phase control circuit 108. Otherwise, if the timer has not expired, then "unbalance firing" continues and, at 156, the logical flag (FF) is cleared as discussed above.

The $\mu$P timer at 144 is preferably employed to minimize the load on the power supply (not shown) for interface 116. Thus, a first count of firing pulses is employed in the balanced mode (FIG. 9A), while a second greater count of firing pulses (FIG. 9B) is employed in the unbalance mode. Alternatively, the width of the firing pulses of FIG. 9B may be adjusted.

Preferably, the "force fire limit level," the "unbalance limit level," and the minimum time period at 144 are determined empirically. As the force fire limit level exceeds the unbalance limit level, if both limits are exceeded, then force firing control at 152 through closed contact 118 takes precedence.

Figure 8:
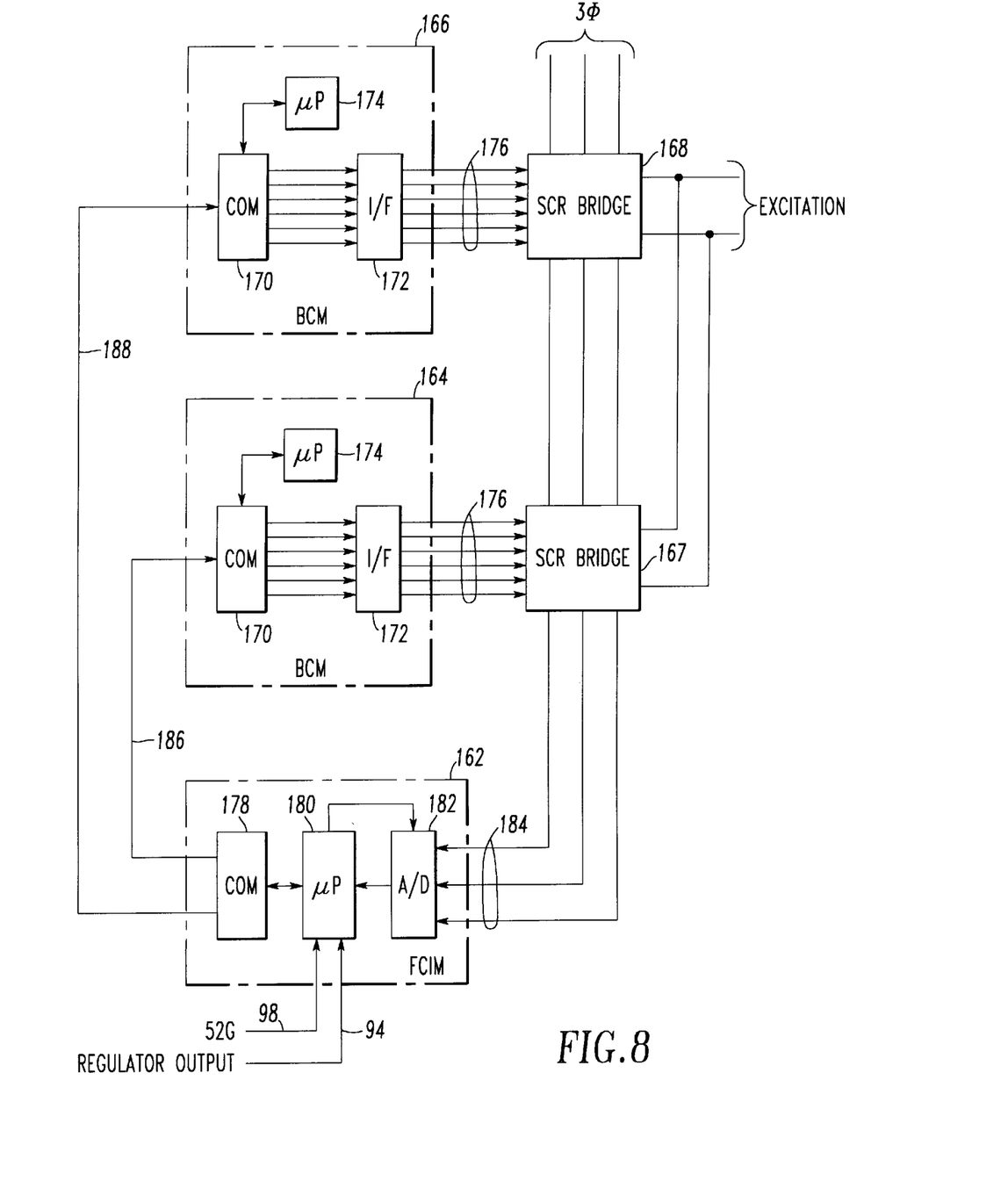
FIG. 8 is a block diagram of a firing control interface module (FCIM) and two bridge control modules (BCMs)

FIG. 8 is a block diagram of a firing control interface module (FCIM) 162 and two bridge control modules (BCMs) 164,166 for respective SCR bridges 167,168. Each of the BCMs 164,166 includes a suitable communications interface (COM) 170, an interface (I/F) 172 to the corresponding bridge 167,168, and a suitable microprocessor ($\mu$P) 174. The COM 170 and $\mu$P 174 cooperate to send six exemplary firing pulses 176 to all of the segments in the corresponding bridge 167,168.

The SCR bridge 167, for example, has its own BCM 164 which communicates with the FCIM 162. The FCIM 162 monitors the input voltage to the bridges 167,168 and also communicates with the other BCM 166. Although two exemplary bridges 167,168 are shown, one, three, or more parallel bridges may employed. It will be appreciated that the FCIM 162 controls and communicates with additional bridges in a similar manner.

The FCIM 162 includes a suitable communications interface (COM) 178, a suitable microprocessor ($\mu$P) 180, and an A/D 182 which samples the three-phase voltages 184 through a suitable interface (not shown). The COM 178 of the FCIM 162 communicates with the COMs 170 of the BCMs 164,166 through suitable communication channels 186,188, respectively. In this manner, the FCIM 162 controls the BCMs 164,166 through the corresponding communication channels. In a preferred mode of operation with the plural bridges 167,168, for the force fire mode of operation, the FCIM 162 sends synchronized control signals to each of the BCMs 164,166. In turn, the BCMs 164,166 repetitively send one or more synchronized firing pulses 176 to all of the SCRs in the corresponding bridges 167,168.

Figure 9B:
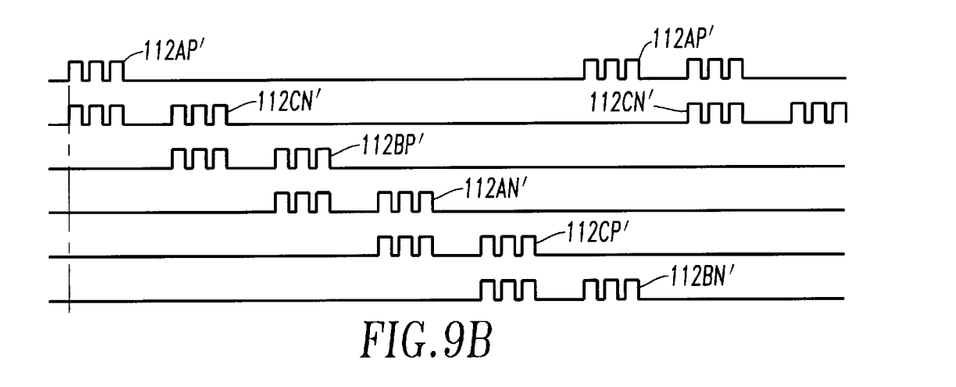

Also referring to FIG. 9B, the FCIM 162 and the BCMs 164,166 cooperate to change the firing pattern in the respective SCR bridges 167,168. The default pattern (FIG. 9A) is preferably sent to all of the BCMs 164,166 via the communications channels 186,188, respectively. Preferably, a user configuration program is employed to readily change the default pattern at the FCIM 162. Otherwise, a factory set default pattern may be employed. Then, when a change to the force fire or phase unbalance mode is desired, the FCIM 162 instructs the BCMs 164,166 to employ a default firing pattern for force fire (FIG. 9C) or phase unbalance (FIG. 9B), whichever the case may be.

The firing pattern allows configuration for various gate requirements of different sized SCRs (e.g., thyristors). When the FCIM 162 detects certain system conditions, it initiates a change to the default firing pattern. When a sufficiently large phase unbalance is detected in the PPT 48, as measured at the input 100 to the PLL 58 of the FCIM 162, the count of pulses is increased. Also, when a sufficiently large error is detected, as also measured at the input 100 to the PLL 58, force fire is invoked and the default pattern is changed for that mode. When phase unbalance and/or force fire are no longer invoked, operation returns to the default firing pattern.

Figure 9C:
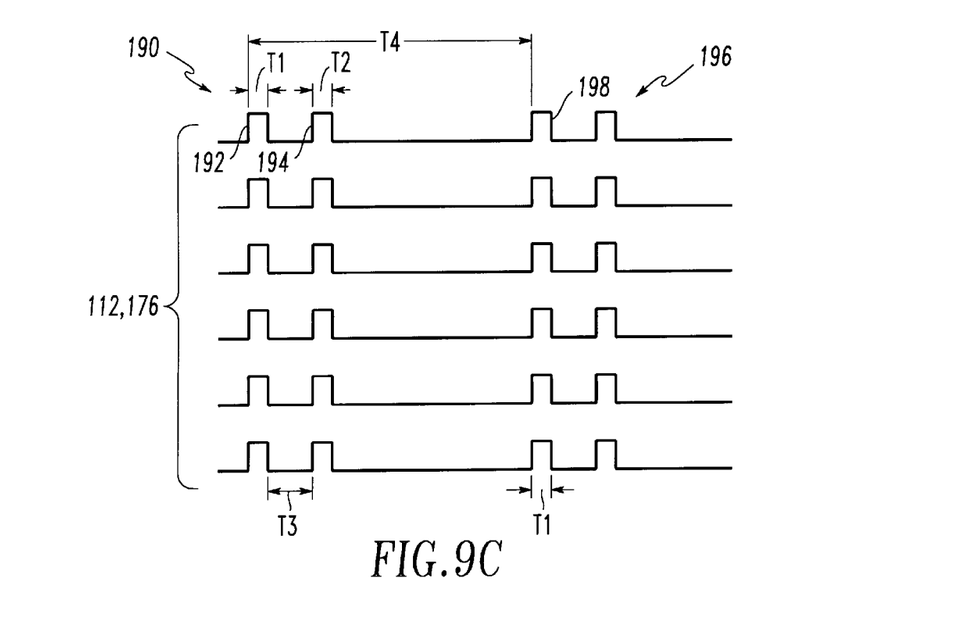

FIG. 9C shows the synchronized force firing pulses 190 which are applied to the six firing signals 112,176. In the exemplary embodiment, the synchronized firing pulses 190 include at least one firing pulse (two exemplary pulses 192,194 are shown in FIG. 9C) for each of the SCRs, with the pulses being repeated at 196. As a further example, in messages sent by the FCIM 162 to each of the BCMs 164,166, the count of pulses and the duration of these pulses are defined by four bits (NS) of those messages which consist of: (1) N, a two-bit number defining one of four possible pulse counts; and (2) S, a two-bit number defining one of four possible pulse sizes (duration).

In this example, there are four possible two-bit numbers and pulse counts: $N=00_2$ provides 1 pulse, $N=01_2$ provides 4 pulses, $N=10_2$ provides 8 pulses, and $N=11_2$ provides 16 pulses. There are also four possible time duration sizes: $S=00_2$ provides 4 $\mu$s duration, $S=01_2$ provides 8 $\mu$s duration, $S=10_2$ provides 12 $\mu$s duration, and $S=11_2$ provides 16 $\mu$s duration. It will be appreciated that the specific example of NS, N and S, the various pulse counts, and the pulse durations are exemplary, and that a wide range of encoding techniques, counts and durations may be employed.

As a further specific example, for $NS=1001_2=9H=9$, a picket pulse burst is provided ($N=10_2$ or 8 pulses, and $S=01_2$ or 8 $\mu$s). In the exemplary embodiment, the duration (T1) of the first force fire pulse 192 is twice the specified duration (T2) of subsequent pulses which are of the specified duration. In this example, the first pulse duration is 16 $\mu$s (2×8 $\mu$s), the interval (T3) separating the pulses 192,194 is 16 $\mu$s (2×8 $\mu$s), and the duration (T2) of the seven additional pulses 194 is 8 $\mu$s each. The total pulse train is 184 $\mu$s, of which there is: 16 $\mu$s (T1) for the double-wide first pulse 192, 56 $\mu$s ((8−1)×8 $\mu$s) single-wide (T2) pulses 194, and 112 $\mu$s (7×2×8 $\mu$s) double-wide (T3) between pulse times. Typically, the picket pulse burst is repeated about every 300 to about 400 $\mu$s (T4), although smaller periods (e.g., 120 $\mu$s)

and larger repetition periods are possible which provide suitable rectification at the output of the bridges 164,166.

When force firing is invoked, the FCIM 162 sends a firing command to fire all the SCRs in all the SCR bridges 167,168. Upon receipt of the initial command, and while force firing is active, the BCMs 164,166 change the firing pulse count and, also, the pulse duration to accommodate the higher energy requirements of this mode The FCIM 162 sends pulses out at a sufficiently high rate in order that any input voltage to the SCR bridges 167,168 is fully rectified. When force firing is stopped, the pulse duration is restored to the previous value (FIG. 9A).

During force firing, the energy in the continuous pulse train is controlled in order that it does not exceed the power supply requirements of the firing circuit 116, or the ratings of any active element (e.g., SCRS, MOSFETs, pulse transformers). In view of the faster force firing repetition period, each command output by the FCIM 162 preferably contains a command that causes the count of pulses to be reduced and the width of the firing pulses to be reduced to an appropriate size, thereby reducing the energy requirements of the continuous pulse train. The FCIM 162 calculates the precise time and pattern of firing and employs the PLL 58. The FCIM 162 passes this information to the COM 178 which initiates the sending of the firing command at the precise time. The COM 178 encodes, serializes and transmits this information to the COMs 170 of the BCMs 164,166. Those COMs 170 receive, decode and implement this information in terms of the physical firing. These COMs 170 also make this information available to the ILPs 174.

For force firing, in which the first firing pulses 192 are output with the extended duration (T1), the local µP 174, after receiving the FCIM's firing command which indicates that all six of the exemplary SCRs should be fired, causes subsequent pulses 194 (as configured by NS) to the SCRs to be reconfigured. In this manner, forcing a firing picket burst may be used by the BCM µP 174 to cause the corresponding bridge 167,168 to act as a diode bridge under some startup conditions, for instance. Thus, the first pulse 192 employs the standard default value of S (e.g., 8 µs) and N (e.g., 4) values, while subsequent first pulses 198 employ the S (e.g., 4 or 8 µs) and N (e.g., 1 or 4) values suitable for force firing. Still other force fire embodiments may employ two, three or more pulses.

For example, under normal operation, at one firing instance, SCRs CPn and ANn may be fired. Then, 2.778 ms later, SCRs CPn and BNn would be fired. Next, within the next 2.778 ms, it is determined that force firing is to be invoked, and the FCIM command indicates that each of the SCRs APn,BPn,CPn,ANn,BNn,CNn is to be fired. In response to that FCIM command, the BCM µPs 174 instruct the COMs 170 to switch from the standard default value of NS to the value suitable for force firing. Then, about 300 to about 400 µs later (T4), with the next FCIM command continuing to indicate that each of the SCRs APn,BPn,CPn, ANn,BNn,CNn is to be fired, the COMs 170 employ the force firing values. In this manner, the count of pulses and/or the duration of pulses employed for force firing may be controlled in order to permit reduced power supply requirements.

In the unbalance mode of operation (FIG. 9B), the count of pulses and/or the duration of pulses may also be suitably selected. For example, the number of pulses could be increased from 4 to 8 or 16, while the pulse duration could be appropriately adjusted up or down or kept the same as in the normal mode of operation (FIG. 9A).

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. An excitation control system for a rotating electrical apparatus including an input having an excitation voltage, said excitation control system comprising:

a controlled rectifier bridge including an input interconnected with a plurality of alternating current phases each of which has a positive polarity and a negative polarity, an output interconnected with the input of said rotating electrical apparatus in order to provide said excitation voltage thereto, and a segment for each of said positive and negative polarities of the alternating current phases, each of said segments having an element responsive to a control signal in order to control current conduction within said segment between the input and the output of said controlled rectifier bridge;

means for requesting a maximum value of said excitation voltage for said rotating electrical apparatus;

means for determining when said rotating electrical apparatus is on-line;

means for providing an error signal from the alternating current phases; and means for outputting the control signals to said segments in order to control current conduction within said segments, said means for outputting including means for repetitively and simultaneously outputting the control signals to each of said segments in response to: (a) said error signal exceeding a predetermined value, (b) the maximum value of said excitation voltage for said rotating electrical apparatus is requested by said means for requesting; and (c) said means for determining determines said rotating electrical apparatus is on-line, in order that said controlled rectifier bridge emulates a diode bridge.

2. The system of claim 1 wherein said means for repetitively and simultaneously outputting the control signals to each of said segments includes means for sending synchronized firing pulses to all of said segments.

3. The system of claim 2 wherein said synchronized firing pulses include at least one firing pulse for each of said segments, with said at least one firing pulse being repeated every about 300 to about 400 µs.

4. The system of claim 1 wherein said means for repetitively and simultaneously outputting the control signals to each of said segments includes means for comparing an absolute value of said error signal with said predetermined value.

5. The system of claim 1 wherein said elements are semiconductor controlled rectifiers.

6. The system of claim 1 wherein said predetermined value is a first predetermined value; and wherein said means for outputting includes means for comparing the absolute value of said error signal with a second predetermined value which is less than said first predetermined value, and means for determining an unbalance mode of operation of said rotating electrical apparatus when said absolute value exceeds said second predetermined value and, otherwise, for determining a balanced mode of operation of said rotating electrical apparatus in order to send, for each repetition, a first plurality of firing pulses to some of said segments in said balanced mode, and to send a second greater plurality of firing pulses to said some of said segments in said unbalance mode.

7. An excitation control system for a rotating electrical apparatus, said rotating electrical apparatus including an output having a plurality of alternating current phases and an input having an excitation voltage, said output for providing power to a power circuit, said excitation control system comprising:

a transformer including a plurality of primary windings interconnected with said alternating current phases and also including a plurality of secondary windings having a plurality of alternating current phases each of which has a positive polarity and a negative polarity;

at least one controlled rectifier bridge each of which includes an input interconnected with the alternating current phases of the secondary windings of said transformer, an output interconnected with the input of said rotating electrical apparatus in order to provide said excitation voltage thereto, and a segment for each of said positive and negative polarities of the alternating current phases of the secondary windings, each of said segments having an element responsive to a control signal in order to control current conduction within said segment between the input and the output of said controlled rectifier bridge;

means for regulating the output of said rotating electrical apparatus, said means for regulating including an output having a signal which requests a maximum value of said excitation voltage for said rotating electrical apparatus;

means for connecting and disconnecting the output of said rotating electrical apparatus to said power circuit, said means for connecting and disconnecting including an output having a signal which indicates that said rotating electrical apparatus is connected to said power circuit;

means for providing an error signal from the alternating current phases of the secondary windings of said transformer; and means for outputting the control signals to said segments in order to control current conduction within said segments, said means for outputting including means for repetitively and simultaneously outputting the control signals to each of said segments in response to: (a) said error signal exceeding a predetermined value, (b) the output of said means for regulating having the signal which requests the maximum value of said excitation voltage for said rotating electrical apparatus, and (c) the output of said means for connecting and disconnecting having the signal which indicates that said rotating electrical apparatus is connected to said power circuit, in order that said controlled rectifier bridge emulates a diode bridge.

8. The system of claim 7 wherein said transformer is a three-phase power potential transformer including three secondary windings; wherein the positive and negative polarities of the alternating current phases of the secondary windings include three phase voltages; and wherein said means for providing an error signal includes means for sensing the three phase voltages and also includes a phase lock loop employing the three sensed phase voltages in order to provide the error signal therefrom.

9. The system of claim 8 wherein said phase lock loop includes means for converting the three sensed phase voltages to a first signal) which is coincident with one of the three sensed phase voltages, and a second signal) which is orthogonal to said first signal.

10. The system of claim 9 wherein said phase lock loop further includes means for providing the error signal as a function of the first signal) and the second signal).

11. The system of claim 10 wherein the three sensed phase voltages have a frequency; wherein said phase lock loop further includes means employing the error signal for providing a frequency which follows the frequency of the three sensed phase voltages, and means for providing an angle from said frequency.

12. The system of claim 11 wherein said angle is θ; wherein said means for providing an error signal includes means for sampling a first voltage from the first signal) and a second voltage from the second signal); wherein said first voltage has a value, $V_{ds}$; wherein the second voltage has a value, $V_{qs}$; and wherein said phase lock loop includes means for calculating the error signal, $V_{dr}$, as:

$$V_{dr} = V_{ds}\sin\theta + V_{qs}\cos\theta.$$

13. The system of claim 11 wherein said means for outputting the control signals includes means employing said frequency and said angle for controlling said segments.

14. The system of claim 7 wherein said at least one controlled rectifier bridge is a plurality of bridges; and wherein said means for outputting the control signals includes a plurality of bridge control means for controlling a corresponding one of said bridges, and a central control circuit to control said bridge control means.

15. The system of claim 14 wherein said central control circuit includes means for sending synchronized control signals to each of said bridge control means; and wherein each of said bridge control means includes means for sending synchronized firing pulses to all of said segments in said corresponding one of said bridges.

16. The system of claim 15 wherein said synchronized firing pulses include at least one firing pulse for each of said segments in all of said bridges, with said at least one firing pulse being repeated every about 300 to about 400 μs.

17. The system of claim 7 wherein said means for repetitively and simultaneously outputting the control signals to each of said segments includes means for comparing an absolute value of said error signal with said predetermined value.

18. The system of claim 7 wherein said elements are semiconductor controlled rectifiers.

19. The system of claim 7 wherein said means for repetitively and simultaneously outputting the control signals to each of said segments includes means for sending a firing pulse to each of said segments at the same time.

20. The system of claim 7 wherein said predetermined value is a first predetermined value; and wherein said means for outputting includes means for comparing the absolute value of said error signal with a second predetermined value which is less than said first predetermined value, and means for determining an unbalance mode of operation of said rotating electrical apparatus when said absolute value exceeds said second predetermined value and, otherwise, for determining a balanced mode of operation of said rotating electrical apparatus in order to send, for each repetition, a first plurality of firing pulses to some of said segments in said balanced mode, and to send a second greater plurality of firing pulses to said some of said segments in said unbalance mode.

* * * * *